Feb. 2, 1937. W. W. WELLER Re. 20,260
WAXING PAD
Original Filed March 10, 1934 2 Sheets-Sheet 1
Fig. 1.
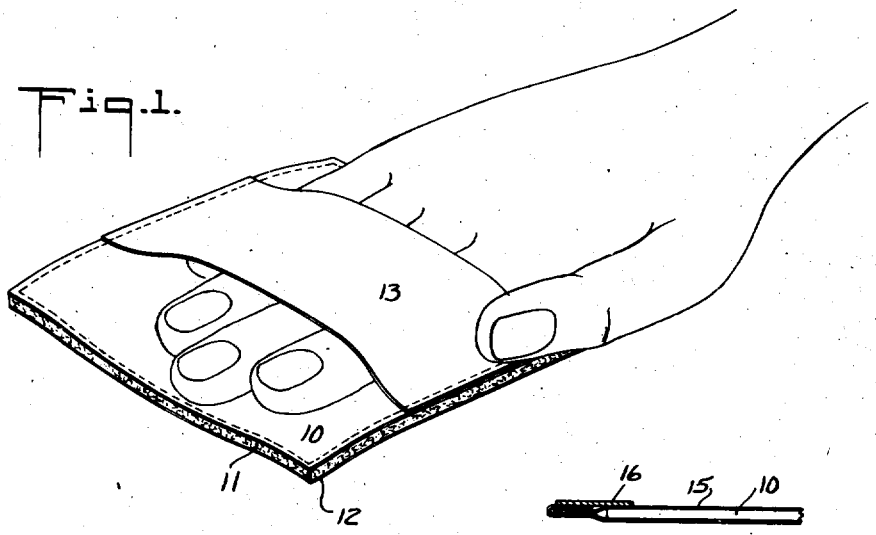
Fig. 4a.
Fig. 2
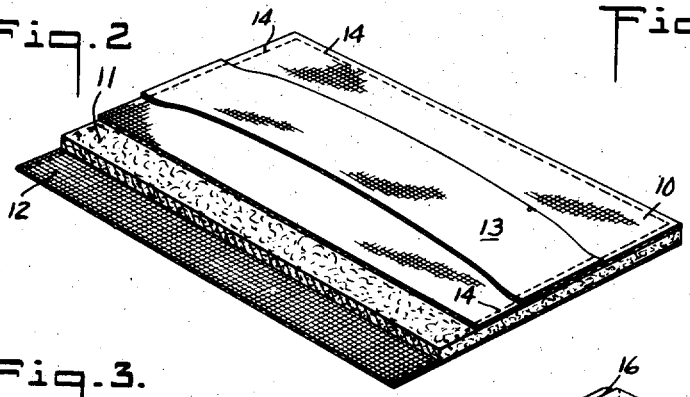
Fig. 3.
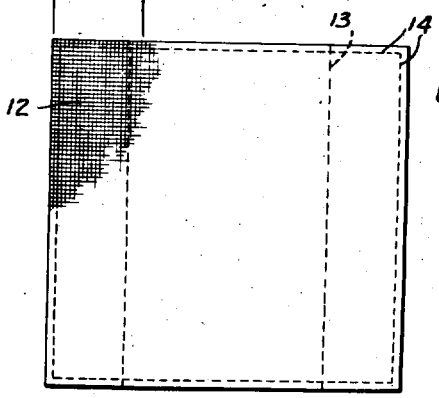
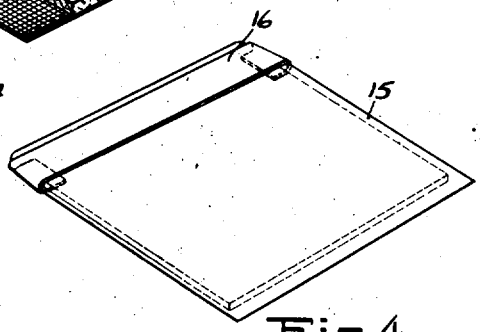
Fig. 4.
INVENTOR.
William W. Weller
BY Gordon B. Scheidell
ATTORNEY.

Feb. 2, 1937. W. W. WELLER Re. 20,260
WAXING PAD
Original Filed March 10, 1934 2 Sheets-Sheet 2
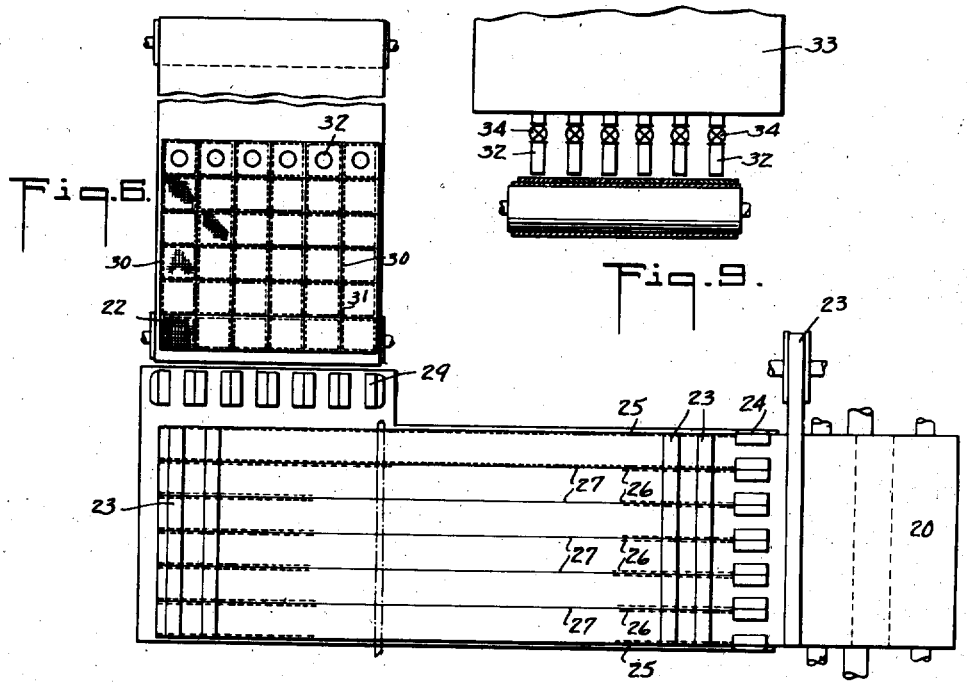
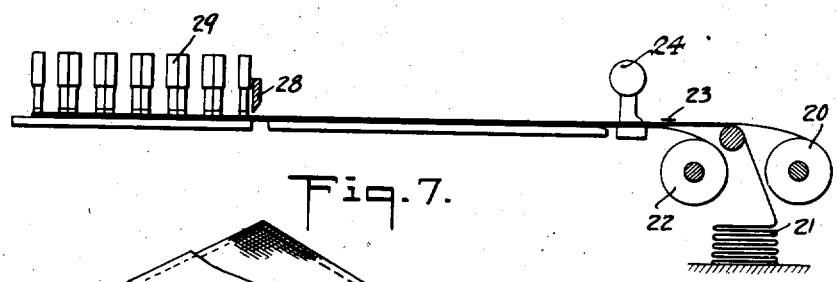
Fig. 7.
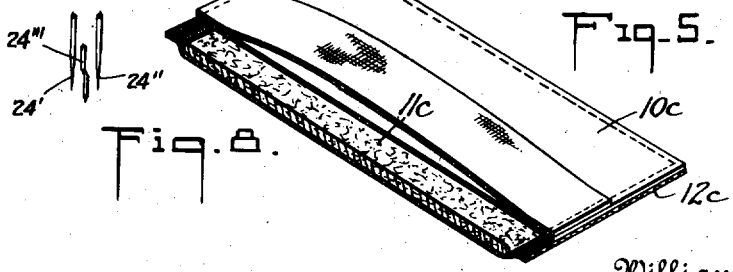
Fig. 5.
Fig. 8.
INVENTOR.
William W. Weller
BY Gordon B. Scheidell
ATTORNEY.

Reissued Feb. 2, 1937

Re. 20,260

UNITED STATES PATENT OFFICE 20,260

WAXING PAD

William W. Weller, Chester, N. J., assignor to Pad-Y-Wax Company, Inc., a corporation of New York Original No. 1,994,425, dated March 12, 1935, Serial No. 714,994, March 10, 1934. Application for reissue November 27, 1936, Serial No. 113,004

7 Claims. (Cl. 91—62.5)

The present invention relates to waxing pads of the type adapted to be used in applying wax or the like to furniture, woodword and automobile bodies.

These pads are made up of a size convenient to be held in the hand and are preferably provided with a strip adapted to pass over the fingers, or may be larger for floor waxing.

It is contemplated that the smaller waxing pads will each be provided with an amount of wax material sufficient for waxing a car body, or for the housewife to wax a number of pieces of furniture.

According to the present invention, the waxing pads preferably employ an impervious flexible backing layer, which may be fabric treated to be resistant to hydro-carbon solvents, a pervious outer layer, preferably of netting or marquisette, and wax. The wax is made available by being distributed throughout a layer of material composed of very loose fibers which act as a cellular retaining medium or reservoir for the wax. The wax mass is preferably of the wax and organic solvent type, containing about 50% to 90% of volatile solvent and from 10% to 50% of solid material consisting of paraffin, carnauba, Montan, and ceresin waxes, etc.

Where the wax material is absorbed in the fibrous layer, it is introduced while heated just above the melting point of the mixture. A measured amount of such wax may be poured onto a completed pillow so as to fill the interstices in the fibrous layer.

Other and further objects of the invention will appear as the description proceeds.

The accompanying drawings show for purposes of illustrating the present invention two of the many possible embodiments in which the invention may take form, it being understood that the drawings are illustrative of the invention rather than limiting the same. In these drawings:

Fig. 1 is a perspective view showing the waxing pad is use;

Fig. 2 is a perspective view with parts broken away showing interior construction;

Fig. 3 is an inverted elevational view showing the front or working face of the pad;

Figs. 4 and 4*a* are perspective and sectional views illustrating the packaging of the pad;

Fig. 5 is a perspective view of the invention showing a modified form of construction;

Fig. 6 is a top plan view diagrammatically showing a set up of a machine for making pads;

Fig. 7 is a side elevational view of the same;

Fig. 8 illustrates the arrangement of needles and shears; and

Fig. 9 illustrates the filling spouts.

The pad shown in Figures 1, 2, and 3 is provided with an impervious backing 10 which may be in the form of light canvas, duck, or denim, rendered impervious to the hydrocarbon solvent for the wax by impregnating it with a nitro cellulose solution, or the like. Adjacent to this backing sheet is a layer 11 of absorbent material such, for example, as loosely-carded fibers of textile material ordinarily referred to as a bat. These fibers are preferably kept as loose as possible so that the maximum intersticial space is available, and yet handle the matted sheet. This absorbent material is covered by a layer 12 of pervious material such as netting, marquisette, or the like. These three layers of material, together with a length of tape, indicated at 13, which forms a handle strap, are sewed together by stitching, extending along the edges of the article, as indicated at 14.

After these parts have been stitched together, the pad is inverted, as shown in Figure 3 and a measured amount of the wax mass (wax and solvent), heated to render it fluid is flowed onto the pad. This wax and solvent wets the fibers and immediately extends throughout the entire body of absorbent material. The process for making these pads is shown in Figs. 6 to 9 inclusive.

These pads may be packaged for sale as indicated in Figs. 4 and 4*a*, by inserting them in an envelope 15, preferably of a laminated material, such as paper or fabric treated to render it substantially vapor proof. The envelope may have a printed trade mark and directions for use. It is sealed by a strip of Scotch tape 16 and this prevents loss of solvent by evaporation.

In the form shown in Fig. 5, a backing layer 10*c*, and a layer 12*c* of netting are stitched together to form a sack-like article. A layer 11*c* of wax or wax bearing material is then introduced, and the fourth side is sewed up, if desired.

A waxing operation is easily carried out by means of one of these pads. The user merely slips the fingers under the strap 13 so as to hold the pad on the hand and then can rub the pad lightly over the surface to which the wax is to be applied. The pressure will cause a small amount of the wax mass to flow and pass through the foraminous material so as to be deposited on the surface of the furniture, automobile body or other article. This provides a thin film of wax suspended in the solvent. The volatile material quickly evaporates leaving the solid wax ready for polishing. The fibrous body in which the wax is distributed readily gives up the wax during the rubbing operation. It readily bends to fit the surface of the article being polished. The kneading incident to such use tends to work the wax toward the face or cover.

It is contemplated that these wax pads will be approximately four inches square and in the neighborhood of an eighth to three-sixteenths of an inch thick, so that each pad will have sufficient wax for covering the surface of the car body or for a number of pieces of furniture. The weight of the loosely carded fibers is exceedingly small as compared with the weight of the wax mass (wax and solvent) which is absorbed in and about the fibers. The fibers in the wax act as a reservoir and dispensing agent so that the wax is gradually made available. If desired, the strap 13 may be wide enough to extend to the end of the pad and be stripped down so as to form a pocket for the fingers.

A suitable method of making the pads shown in Figures 1–3 is indicated in Figures 6–9 inclusive. The supply of backing material is indicated at 20, the lightly carded material at 21, the netting at 22 and the tape for the straps at 23. This material may be first passed through a battery of multiple stitching and slitting machines indicated at 24, having needles 24′ and 24″ and knives 24‴ to form stitches indicated at 25, 26, 26 and to cut the material, to form narrow strips, as indicated at 27. The strips are fed along a table and passed under a knife 28 by which they are cut off to lengths sufficient for several pads. The strips are then passed through another battery of stitching and slitting machines 29 which sew up the other sides of the pillows, as indicated at 20, and cut them apart, as indicated at 31. The pillows are then turned over so that the netting is on top and passed, by a belt or other suitable device, under a battery of filling spouts 32 connecting with a tank 33 containing the wax and solvent of the desired composition and heated just warm enough to be fluid. Valves 34 control the flow of wax so that the proper amount is discharged. The warm wax passes through the netting and distributes itself all through the spaces in the fibrous layer, where it quickly stiffens so that the pads may be packed. It will, of course, be understood that the pads may be sewed up, one at a time out of properly cut layers, and the wax flowed onto the pad from a heated dish.

It will be obvious to those skilled in the art that various changes may be made in the device as illustrated without departing from the spirit or scope of the appended claims.

I claim:

1. A waxing pad comprising a backing member, a pervious fabric cover member and an absorbent layer of non-felted, loosely-carded, unspun fibres therebetween, forming a high capacity wax-retaining medium, said backing member being impervious to wax and solvents therefor; and a wax mass comprising wax and wax-solvent distributed through and retained by said fibre layer, said cover member being permeable to said wax mass, whereby during use of said pad to apply wax to a surface, the said wax mass will be gradually fed to said surface through the cover member from the wax retaining medium.

2. A waxing pad comprising a backing member, a previous fabric cover member and an absorbent layer of non-felted, loosely carded, unspun fibers therebetween, forming a high capacity wax-retaining medium, said backing member containing a cellulose composition by which it is rendered impervious to wax and solvents therefor; and a wax mass comprising wax and wax-solvent distributed through and retained by said fibre layer, said cover member being permeable to said wax mass, whereby during use of said pad to apply wax to a surface, the said wax mass will be gradually fed to said surface through the cover member from the wax retaining medium.

3. A waxing pad comprising a backing member, a pervious fabric cover member and an absorbent layer of non-felted, loosely-carded, unspun fibres therebetween, forming a high capacity wax-retaining medium, said backing member being impervious to wax and solvents therefor; a wax mass comprising wax and wax-solvent distributed through and retained by said fiber layer, said cover member being permeable to said wax mass and a handle secured to the backing side of the said pad, whereby during use of said pad to apply wax to a surface, the said wax mass will be gradually fed to said surface through the cover member from the wax retaining medium, and the pad may be securely held in place on the hand of the operator.

4. A waxing pad comprising a backing member, a pervious fabric cover member and an absorbent layer of non-felted, loosely carded, unspun fibers therebetween, forming a high capacity wax-retaining medium, said backing member being impervious to wax and solvents therefor; a wax mass comprising wax and wax solvent distributed through and retained by said fiber layer, said cover member being permeable to said wax mass and a handle strap secured to the backing side of said pad by stitching serving to hold the said backing and cover members together.

5. A waxing implement comprising, a container including two opposed walls, one of which is impervious to wax and wax solvents, the other of which is pervious to wax in a solvent, a compressible structure contained within said applicator between said walls and of skeleton formation producing a multiplicity of voids, and a charge of wax dispersed through said voids to be exuded through said pervious wall upon compression of said skeleton structure as a result of force applied to said impervious wall.

6. An applicator structure comprising, a compressible container in the form of an envelope having at least one wall thereof of material pervious to a contained polishing agent, a mass of polishing agent within said container subject to exudation through said pervious wall, and means dispersed through said mass of polishing agent for retaining the same in a coalesced condition within said container subject to exudation through said pervious wall upon application of compressive force to the exterior of said container.

7. A waxing applicator comprising, a mass of polishing compound composed of wax and solvent of a consistency suitable to a polishing operation and easily flowed under pressure, a multiplicity of fibers dispersed through said mass of compound to retain the same in coalesced condition, a container enclosing said mass and comprising an envelope having two opposed walls, one of said walls being impervious to said compound, and the other of said walls being pervious to said compound when a pressure is applied to said mass through said impervious wall.

WILLIAM W. WELLER.